(12) United States Patent
Shinohara

(10) Patent No.: US 11,541,281 B2
(45) Date of Patent: Jan. 3, 2023

(54) GOLF BALL AND RESIN COMPOSITION FOR COVER OR TOPCOAT THEREOF

(71) Applicant: BRIDGESTONE SPORTS CO., LTD., Tokyo (JP)

(72) Inventor: Hirotaka Shinohara, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 17/494,242

(22) Filed: Oct. 5, 2021

(65) Prior Publication Data

US 2022/0193500 A1 Jun. 23, 2022

(30) Foreign Application Priority Data

Dec. 22, 2020 (JP) .............................. JP2020-212550

(51) Int. Cl.
| | | |
|---|---|---|
| A63B 37/12 | (2006.01) | |
| A63B 37/14 | (2006.01) | |
| A63B 37/00 | (2006.01) | |
| C09D 5/32 | (2006.01) | |
| C09D 7/63 | (2018.01) | |
| C09D 175/04 | (2006.01) | |
| C08K 5/09 | (2006.01) | |
| C08K 5/13 | (2006.01) | |

(52) U.S. Cl.
CPC .... *A63B 37/00221* (2020.08); *A63B 37/0024* (2013.01); *A63B 37/0074* (2013.01); *A63B 37/00223* (2020.08); *A63B 37/00373* (2020.08); *C08K 5/09* (2013.01); *C09D 5/32* (2013.01); *C09D 7/63* (2018.01); *C09D 175/04* (2013.01); *A63B 37/0022* (2013.01); *C08K 5/13* (2013.01)

(58) Field of Classification Search
CPC .......... A63B 37/0022; A63B 37/00221; A63B 37/00223; A63B 37/0024; A63B 37/00373; C09D 7/63; C09D 5/32; C09D 175/00; C09D 175/04; C09D 175/06; C09D 175/08; C08K 5/09; C08K 5/13; C08L 75/00; C08L 75/04; C08L 75/06; C08L 75/08

See application file for complete search history.

(56) References Cited

U.S. PATENT DOCUMENTS

| | | | | |
|---|---|---|---|---|
| 5,494,291 | A * | 2/1996 | Kennedy | C08K 5/20 473/378 |
| 5,840,788 | A * | 11/1998 | Lutz | C08K 5/005 524/100 |
| 2009/0062037 | A1* | 3/2009 | Ohama | A63B 37/0003 473/378 |
| 2009/0075759 | A1* | 3/2009 | Nakamura | C08G 18/7664 473/378 |
| 2010/0062876 | A1* | 3/2010 | Shinohara | A63B 37/0024 473/378 |
| 2015/0102521 | A1* | 4/2015 | Nagasawa | B29C 45/14819 264/241 |
| 2017/0182366 | A1* | 6/2017 | Shinohara | C09D 133/14 |

FOREIGN PATENT DOCUMENTS

| | | |
|---|---|---|
| JP | 2000-516521 A | 12/2000 |
| JP | 2009-050420 A | 3/2009 |

* cited by examiner

*Primary Examiner* — John E Simms, Jr.
(74) *Attorney, Agent, or Firm* — Sughrue Mion, PLLC

(57) ABSTRACT

Provided are a golf ball and a resin composition for a cover or topcoat thereof which can suppress the yellowing of the golf ball caused by ultraviolet rays even if a naturally derived substance is used as an ultraviolet absorber, and they are environmentally and human friendly. A resin composition for a cover or topcoat of a golf ball of the present invention contains: a resin for a cover or topcoat; and a plant-derived extract which absorbs ultraviolet rays. The resin composition has a color difference ΔE of 10.0 or less in a Lab color system between before and after a color tone change test, the color tone change test being carried out by irradiating a film formed from the resin composition with a xenon lamp. In the golf ball of the present invention, the cover or the topcoat is formed by using the resin composition.

7 Claims, No Drawings

GOLF BALL AND RESIN COMPOSITION FOR COVER OR TOPCOAT THEREOF

CROSS-REFERENCE TO RELATED APPLICATION

This application claims priority from Japanese Patent Application No. 2020-212550 filed Dec. 22, 2020, which is incorporated herein by reference in its entirety.

FIELD OF THE INVENTION

The present invention relates to a golf ball and to a resin composition for a cover or topcoat thereof, and in particular, relates to a golf ball and to a resin composition for a cover or topcoat thereof which contains an improved ultraviolet absorber.

Various golf balls have been marketed, such as golf balls with colorful appearances or color patterns, but common golf balls have a white background surface on which a golf ball manufacturer name, a brand name, a logo, or a symbol such as a number is provided. White golf balls are usually produced by forming a cover with dimples by using a resin containing a white pigment, and then forming a colorless transparent topcoat on the surface of the cover.

The resin for the cover of the golf ball may be easily yellowed when exposed to sunlight. In order to prevent such yellowing, the cover or the topcoat thereon may contain an ultraviolet absorber which absorbs ultraviolet rays in sunlight, or may contain a fluorescent whitening agent which absorbs ultraviolet rays and emits visible rays having predetermined wavelengths in order to make the color look more distinctively white.

JP 2009-050420 A discloses such an ultraviolet absorber. In order to effectively suppress the discoloration of a urethane resin constituting a cover of a golf ball, both a cover and a topcoat contain a benzotriazole-based and a triazine-based ultraviolet absorber as the ultraviolet absorber.

JP 2000-516521 A discloses that a UV light absorber is blended in a visible light transmitting urethane topcoat composition for a golf ball. The UV light absorber can protect a topcoat from both solar UV and UV light used to cure UV curable ink, and has an absorption peak at a wavelength of approximately 330 nm to approximately 360 nm and has UV light absorbance at a wavelength of approximately 350 nm which is at least approximately 3 times greater than UV light absorbance at a wavelength of approximately 370 nm in order to reduce or prevent discoloration and yellowing. As a preferable UV absorber, 2,4-bis (2,4-dimethylphenyl)-6-(2-hydroxy-4-isooctyloxyphenyl)-1,3,5-triazine is disclosed.

SUMMARY OF THE INVENTION

The ultraviolet absorbers used for the golf ball are composed of petroleum-derived resources, including those described in the above literature, whereby the ultraviolet absorbers are not environmentally and human friendly. Rather than petroleum-derived resources, naturally-derived resources have been also required to be used for the golf ball. However, the present inventors have found that when the yellowing of the golf ball caused by ultraviolet rays is actually suppressed by using a naturally-derived substance known to have an ultraviolet absorption effect, the naturally-derived substance has problems in terms of heat resistance, transparency, and discoloration prevention effect.

The present invention has therefore been made in light of the above problems, and an object of the present invention is to provide a golf ball, and a resin composition for cover or topcoat thereof which can suppress the yellowing of the golf ball caused by ultraviolet rays, even if a naturally-derived substance is used as an ultraviolet absorber, and they are environmentally and human friendly.

In order to achieve the above object, according to an aspect of the present invention, a golf ball includes a core, a cover, and a topcoat, wherein the cover or the topcoat includes a plant-derived extract which absorbs ultraviolet rays, and the cover or the topcoat has a color difference ΔE of 10.0 or less in a Lab color system between before and after a color tone change test, the color tone change test being carried out by irradiation with a xenon lamp.

The plant-derived extract may include ferulic acid, a ferulic acid compound, a cinnamic compound, linoleic acid, or a combination thereof.

The plant-derived extract may have an absorbance peak at a wavelength of 320 nm to 360 nm.

When the topcoat includes the plant-derived extract, the topcoat may further include an oil-based coating material.

According to another aspect of the present invention, a resin composition for a cover or topcoat of a golf ball includes: a resin for a cover or topcoat of the golf ball; and a plant-derived extract which absorbs ultraviolet rays, wherein the resin composition has a color difference ΔE of 10.0 or less in a Lab color system between before and after a color tone change test, the color tone change test being carried out by irradiating a film formed from the resin composition with a xenon lamp.

The resin for topcoat may include a urethane coating material containing a main agent and a curing agent. In this case, a content of the plant-derived extract may be in a range of 0.01 to 8.0% by mass with respect to a total amount of the main agent inclusive of a solvent.

The solvent may include an ester solvent or a ketone solvent.

According to the present invention, the plant-derived extract which absorbs ultraviolet rays is blended in the resin composition for a cover or topcoat of the golf ball, whereby the cover or topcoat of the golf ball can have a color difference ΔE of 10.0 or less in the Lab color system between before and after the color tone change test, the color tone change test being carried out by irradiation with the xenon lamp. This makes it possible to provide the golf ball which can suppress the yellowing of the golf ball caused by ultraviolet rays even if the naturally derived substance is used as the ultraviolet absorber and is environmentally and human friendly.

In particular, the ferulic acid compound and the cinnamic compound as the plant-derived extract which absorbs ultraviolet rays are poorly soluble in water, but are oil-soluble. Therefore, by adopting oil-based coating materials such as the urethane coating material containing the main agent and the curing agent as the resin for topcoat, the ferulic acid compound and the cinnamic compound can be blended in the topcoat. By not using an aromatic solvent which is not environmentally and not human friendly, but the ester solvent or the ketone solvent as a solvent for the resin for topcoat, a golf ball which is more environmentally and human friendly can be provided.

DESCRIPTION OF PREFERRED EMBODIMENTS

Hereinafter, embodiments of a golf ball, and a resin composition for a cover or topcoat thereof according to the present invention, will be described in detail.

The resin composition for a cover or topcoat of the present embodiment contains a resin for a cover or topcoat of a golf ball, and a plant-derived extract which absorbs ultraviolet rays (referred to as "phytochemical").

As the resin for a cover, a thermoplastic polyurethane, an ionomer resin, or a mixture thereof can be used as a main component, but the resin for a cover is not limited thereto.

The structure of the thermoplastic polyurethane material is composed of a soft segment composed of a polymer polyol (polymeric glycol) and a chain extender and polyisocyanate constituting a hard segment. Here, the polymer polyol to be a raw material is not particularly limited, but is preferably, in the present invention, a polyester-based polyol and a polyether-based polyol. Specific examples of the polyester-based polyol include adipate-based polyols such as polyethylene adipate glycol, polypropylene adipate glycol, polybutadiene adipate glycol, and polyhexamethylene adipate glycol; and lactone-based polyols such as polycaprolactone polyol. Examples of the polyether polyol include poly(ethylene glycol), poly(propylene glycol), and poly(tetramethylene glycol).

The chain extender is not particularly limited, but in the present invention, it is possible to use, as the chain extender, a low molecular weight compound having two or more active hydrogen atoms which can react with isocyanate groups in the molecule thereof, and having a molecular weight of 2,000 or less. In particular, an aliphatic diol having 2 to 12 carbon atoms is preferable. Specific examples of the chain extender include 1,4-butylene glycol, 1,2-ethylene glycol, 1,3-butanediol, 1,6-hexanediol, and 2,2-dimethyl-1,3-propanediol. In particular, 1,4-butylene glycol is preferable.

The polyisocyanate compound is not particularly limited, but in the present invention, for example, it is possible to use one or two or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene 1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, and dimeric acid diisocyanate. However, some isocyanate species make it difficult to control the cross-linking reaction during injection molding. Accordingly, in the present invention, 4,4'-diphenylmethane diisocyanate, which is an aromatic diisocyanate, is preferable from the viewpoint of the balance between the stability during production and the developed physical properties.

As the ionomer resin, it is possible to use a resin containing, as a base resin, the following (a) component and/or the following (b) component, but the ionomer resin is not limited thereto. To the base resin, the following (c) component can be optionally added. The (a) component is a ternary random olefin-unsaturated carboxylic acid-unsaturated carboxylic acid ester copolymer and/or a metal salt thereof; the (b) component is an olefin-unsaturated carboxylic acid binary random copolymer and/or a metal salt thereof; and the (c) component is a thermoplastic block copolymer having a crystalline polyolefin block, and polyethylene/butylene random copolymer.

In the resin for a cover, in addition to the main component of the above thermoplastic polyurethane or ionomer resin, thermoplastic resins or elastomers other than the thermoplastic polyurethane can be blended. Specifically, it is possible to use one or two or more selected from a polyester elastomer, a polyamide elastomer, an ionomer resin, a styrene block elastomer, a hydrogenated styrene butadiene rubber, a styrene-ethylene/butylene-ethylene block copolymer or a modified product thereof, an ethylene-ethylene/butylene-ethylene block copolymer or a modified product thereof, a styrene-ethylene/butylene-styrene block copolymer or a modified product thereof, an ABS resin, polyacetal, polyethylene and a nylon resin. In particular, for example, because the resilience and the abrasion resistance are improved due to the reaction with the isocyanate group while the productivity is satisfactorily maintained, it is suitable to adopt a polyester elastomer, a polyamide elastomer, and polyacetal. When the above components are blended, the blending amounts thereof are appropriately selected, without being particularly limited, according to the regulation of the hardness, the improvement of the resilience, the improvement of the fluidity, and the improvement of the adhesiveness and the like of the cover material. However, the blending amounts of the above components can be preferably set to be 5 parts by mass or more with respect to 100 parts by mass of the thermoplastic polyurethane component. The upper limit of the blending amount is also not particularly limited, but can be set to be preferably 100 parts by mass or less, more preferably 75 parts by mass or less, and still more preferably 50 parts by mass or less, with respect to 100 parts by mass of the thermoplastic polyurethane component. In addition, polyisocyanate compounds, fatty acids or derivatives thereof, basic inorganic metal compounds, and fillers and the like can be added.

As the resin for topcoat, for example, coating material resins such as a urethane coating material composed of a polyol as a main agent and a polyisocyanate as a curing agent, and a rubber-based coating material can be used as a main component, but the resin for the topcoat is not particularly limited thereto. The coating material resins are oil-based coating materials containing organic solvents. The material for forming the topcoat may contain, as an additive, a low-surface energy composition such as a silicone wax in addition to the above main component. Hereinafter, the respective components will be described.

As the polyol, a polycarbonate polyol or a polyester polyol is preferably used, but the polyol is not limited thereto. Two types of polyester polyols, that is, a polyester polyol (A) and a polyester polyol (B) may also be used. It is suitable that when these two types of polyester polyols are used, the two types of polyester polyols are different in the weight average molecular weight (Mw); the weight average molecular weight (Mw) of the (A) component is 20,000 to 30,000; and the weight average molecular weight (Mw) of the (B) component is 800 to 1,500. The weight average molecular weight (Mw) of the (A) component is more preferably 22,000 to 29,000, and still more preferably 23,000 to 28,000. The weight average molecular weight (Mw) of the (B) component is more preferably 900 to 1,200, and still more preferably 1,000 to 1,100.

The polyester polyol is obtained by the polycondensation between a polyol and a polybasic acid. Examples of the polyol include diols such as ethylene glycol, 1,2-propanediol, 1,3-propanediol, 1,3-butanediol, 1,4-butanediol, 1,6-hexanediol, neopentylglycol, diethylene glycol, dipropylene glycol, hexylene glycol, dimethylolheptane, polyethylene glycol, and polypropylene glycol; triols; tetraols, and polyols having an alicyclic structure. Examples of the polybasic acid include aliphatic dicarboxylic acids such as succinic acid, adipic acid, sebacic acid, azelaic acid, and dimer acid; aliphatic unsaturated dicarboxylic acids such as fumaric acid, maleic acid, itaconic acid, and citraconic acid; aromatic polybasic carboxylic acids such as phthalic acid, isophthalic acid, terephthalic acid, trimellitic acid, and pyromellitic acid; dicarboxylic acids having an alicyclic structure such as tetrahydrophthalic acid, hexahydrophthalic acid, 1,3-cyclohexanedicarboxylic acid, 1,4-cyclohexanedicarboxylic acid, and endomethylene tetrahydrophthalic acid; and tris-2-carboxyethyl isocyanurate. In particular, as the polyester polyol of the (A) component, polyester polyols having a cyclic structure introduced into the resin skeleton can be adopted. Examples of such a polyester polyol include a polyester polyol obtained by the polycondensation between a polyol having an alicyclic structure such as cyclohexane dimethanol and a polybasic acid, or a polyester polyol obtained by the polycondensation between a polyol having an alicyclic structure and diols or a triol and a polybasic acid. As the polyester polyol of the (B) component, a polyester polyol having a multibranched structure can be adopted. Examples of such a polyester polyol include polyester polyols having a branched structure such as "NIPPOLAN 800" manufactured by Tosoh Corporation.

When such a polyester polyol as described above is used, the weight average molecular weight (Mw) of the entirety of the main agent is preferably 13,000 to 23,000, and more preferably 15,000 to 22,000. The number average molecular weight (Mn) of the entirety of the main agent is preferably 1,100 to 2,000, and more preferably 1,300 to 1,850. When these average molecular weights (Mw and Mn) deviate from the above ranges, the abrasion resistance of the topcoat may be deteriorated. The weight average molecular weight (Mw) and the number average molecular weight (Mn) are measured values (polystyrene equivalent values) on the basis of gel permeation chromatography (hereinafter, abbreviated as GPC) measurement based on differential refractive index meter detection. Even when two types of polyester polyols are used, the Mw and Mn of the entirety of the main agent are within the above ranges.

The blending amounts of the above two types of polyester polyols (A) and (B) are not particularly limited, but the blending amount of the (A) component is preferably 20 to 30% by mass with respect to the total amount of the main agent inclusive of the solvent, and the blending amount of the (B) component is preferably 2 to 18% by mass with respect to the total amount of the main agent.

The polyisocyanate is not particularly limited, but is any of generally used aromatic, aliphatic, and alicyclic polyisocyanates and the like. Specific examples of such a polyisocyanate include trilene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate, and 1-isocyanato-3,3,5-trimethyl-4-isocyanatomethylcyclohexane. These can each be used alone, or as mixtures of two or more thereof.

Examples of the modified product of the above hexamethylene diisocyanate include polyester-modified products and urethane-modified products of hexamethylene diisocyanate. Examples of the derivative of the above hexamethylene diisocyanate include nurates (isocyanurates), biurets and adducts of hexamethylene diisocyanate.

In the urethane coating material composed of a polyol and a polyisocyanate as the main component, the lower limit of the molar ratio (NCO group/OH group) between a hydroxyl group (OH group) belonging to the polyol and an isocyanate group (NCO group) belonging to the polyisocyanate is preferably 0.6 or more, and more preferably 0.65 or more. The upper limit of this molar ratio is preferably 1.5 or less, more preferably 1.0 or less, and still more preferably 0.9 or less. When this molar ratio is smaller than the above lower limit, unreacted hydroxyl groups remain, and the performance and the water resistance as the topcoat may be deteriorated. In addition, when this molar ratio is greater than the above upper limit, the isocyanate group is excessively present, whereby the reaction between the isocyanate group and the water content produces a urea group, which makes the topcoat fragile. Consequently, the performance of the topcoat may be deteriorated.

As a curing catalyst (organometallic compound) promoting the reaction between the polyol and the polyisocyanate, an amine-based catalyst or an organometallic catalyst can be used. As the organometallic compounds, compounds conventionally blended as the curing agents of a two-component curing type urethane coating material such as metal soaps of aluminum, nickel, zinc, and tin and the like can be suitably used.

The polyol as a main agent and the polyisocyanate as a curing agent can be mixed with various types of organic solvents according to coating conditions. Examples of such an organic solvent include aromatic solvents such as toluene, xylene, and ethyl benzene; ester solvents such as ethyl acetate, butyl acetate, propylene glycol methyl ether acetate, and propylene glycol methyl ether propionate; ketone solvents such as acetone, methyl ethyl ketone, methyl isobutyl ketone, and cyclohexanone; ether solvents such as diethylene glycol dimethyl ether, diethylene glycol diethyl ether, and dipropylene glycol dimethyl ether; alicyclic hydrocarbon solvents such as cyclohexane, methylcyclohexane, and ethylcyclohexane; and petroleum hydrocarbon solvents such as mineral spirit.

In particular, the aromatic solvents such as toluene and xylene are not environmentally and human friendly, whereby the ester solvent or the ketone solvent is preferably used. In particular, from the viewpoint of readily dissolving the plant-derived extract, the ester solvents such as butyl acetate and ethyl acetate are more preferable. In the plant-derived extract, a ferulic acid compound and a cinnamic compound are oil-soluble, and poorly soluble in water.

Examples of the plant-derived extract which absorbs ultraviolet rays include ferulic acid, a ferulic acid compound, a cinnamic compound, and linoleic acid, but the plant-derived extract is not limited thereto. A plant-derived extract having an action of absorbing ultraviolet rays is known, but ultraviolet absorption effect greatly differs depending on the plant-derived extract. A wavelength region which is effective as the ultraviolet absorber used for the golf ball is preferably 200 to 400 nm, more preferably 280 to 360 nm, and still more preferably 320 to 360 nm. That is, it is preferable that the plant-derived extract absorb ultraviolet rays in an extended UVA wavelength region.

Examples of the plant-derived extract absorbing ultraviolet rays in such a wavelength region include ferulic acid, a ferulic acid compound, a cinnamic compound, and recinoleic acid. The ferulic acid and the ferulic acid compound are contained in grains such as rice, wheat, rye, and barley, and seeds of coffee, apple, artichoke, peanut, orange, and pineapple and the like, and are particularly extracted from rice bran. The ferulic acid and the ferulic acid compound have an absorbance peak in a wavelength region of 320 to 360 nm. Examples of the ferulic acid compound include ferulic acid esters such as γ-orizanol.

The cinnamic compound is extracted from shea butter or coconut oil, and has an absorbance peak in a wavelength region of 280 to 320 nm. Examples of the cinnamic compound include cinnamic acid esters such as methyl cinnamate, ethyl cinnamate, 2,4-diisopropyl methyl cinnamate, 2,4-diisopropyl ethyl cinnamate, octyl p-dimethylaminobenzoic acid, p-methoxy sodium cinnamate, and p-methoxy potassium cinnamate.

The recinoleic acid is extracted from castor oil, soybean oil, corn oil, and camellia oil and the like, and has an absorbance peak in a wavelength region of approximately 230 nm.

The plant-derived extract which absorbs ultraviolet rays is preferably added to the main agent for topcoat in the case of the resin composition for topcoat. The blending amount of the plant-derived extract is set to be an amount sufficient to provide a color difference ΔE of 10.0 or less in a Lab color system in a color tone change test carried out by irradiation with a xenon lamp, described in detail later. For example, the blending amount of the plant-derived extract is preferably 0.01% by mass or more, more preferably 0.1% by mass or more, even more preferably 0.5% by mass or more, and even still more preferably 1.0% by mass or more, with respect to the total amount of the main agent inclusive of a solvent, but the blending amount of the plant-derived extract is not limited thereto. The upper limit of the blending amount of the plant-derived extract is, for example, preferably 8.0% by mass or less, more preferably 7.0% by mass or less, even more preferably 6.0% by mass or less, and even still more preferably 5.0% by mass or less, but the upper limit of the blending amount is not limited thereto because some plant-derived extracts have low solubility in a solvent, and may have an influence on the appearance or flight performance of the golf ball when the plant-derived extracts remain in a resin.

In the case of the resin composition for a cover, the blending amount of the plant-derived extract is an amount sufficient to provide a color difference ΔE of 10.0 or less in a Lab color system in a color tone change test carried out by irradiation with a xenon lamp, as described above. For example, the blending amount of the plant-derived extract is preferably 0.5% by mass or more, and preferably 5.0% by mass or less, with respect to the resin as the base material of the cover, but the blending amount of the plant-derived extract is not limited thereto.

In addition to the above components, white pigments and pearlescent pigments and the like may be added to the resin composition for a cover or topcoat as necessary.

In the resin composition for a cover or topcoat of the present embodiment, a color difference ΔE in the Lab color system is 10.0 or less in a color tone change test in which a film formed from the resin composition is irradiated with a xenon lamp. The color difference ΔE in the Lab color system is measured in conformity with HS Z 8730-1980. As the color difference ΔE value is less, the discoloration is less. The color difference ΔE is set to be 10.0 or less, whereby color tone changes which may occur due to exposure to sunlight can be suppressed. The color difference ΔE is preferably 8.0 or less, and more preferably 6.5 or less. The lower limit of the color difference ΔE is not particularly limited, but is preferably, for example, 0 or near-zero.

In the resin composition for a cover or topcoat of the present embodiment, a yellowing level ΔYI is preferably 16 or less in a yellowness index change test in which a film formed from the resin composition is irradiated with a xenon lamp. The lower limit of the yellowing level ΔYI is not particularly limited, but is preferably, for example, 0 or near-zero. The yellowing level YI is measured in conformity with JIS Z 8722. The yellowing level ΔYI changes depending on a pigment blended in the resin composition for a cover or topcoat, but also changes depending on the type and blending amount of the ultraviolet absorber. The above range makes it possible to provide a white appearance to the golf ball. The transparency of the plant-derived extract which absorbs ultraviolet rays of the present embodiment is maintained even when exposed to sunlight, whereby the plant-derived extract can be blended in the cover or the topcoat without having an influence on the appearance of the golf ball.

Next, embodiment of a method for producing a golf ball by using the resin composition for a cover or topcoat will be described.

The golf ball according to the present embodiment can adopt a multi-piece structure such as a two-piece structure constituted by a core and a cover or a three-piece structure constituted by a core, a cover, and an intermediate layer provided between the core and the cover.

The core can be formed primarily of a base material rubber. As the base material rubber, a wide variety of rubbers (thermosetting elastomers) can be used. For example, the following rubbers can be used: a polybutadiene rubber (BR), a styrene-butadiene rubber (SBR), a natural rubber (NR), a polyisoprene rubber (IR), a polyurethane rubber (PU), a butyl rubber (IIR), a vinyl polybutadiene rubber (VBR), an ethylene-propylene rubber (EPDM), a nitrile rubber (NBR), and a silicone rubber, but the base material rubber is not limited thereto. As the polybutadiene rubber (BR), for example, 1,2-polybutadiene and cis-1,4-polybutadiene and the like can be used.

To the core, in addition to the base material rubber to be a main component, for example, a co-cross-linking material, a cross-linking agent, a filler, an antiaging agent, an isomerization agent, a peptizer, sulfur, and an organosulfur compound can be optionally added. As the main component, in place of the base material rubber, a thermoplastic elastomer, an ionomer resin, or a mixture of these can also be used.

The core substantially has a spherical shape. The upper limit of the outer diameter of the core is preferably approximately 42 mm or less, more preferably approximately 41 mm or less, and still more preferably approximately 40 mm or less. The lower limit of the outer diameter of the core is preferably approximately 5 mm or more, more preferably approximately 15 mm or more, and most preferably approximately 25 mm or more. The core may be solid or hollow. The core may have a single layer, or may be a core composed of a plurality of layers such as the center core and a layer surrounding the core.

As the method for molding the core, it is possible to adopt a known method for molding a core of a golf ball. For example, a core can be obtained by kneading a material containing a base material rubber with a kneading machine, and by pressure vulcanization molding of the resulting kneaded product with a round mold, but the method is not limited thereto. As a method for molding a core having a plurality of layers, it is possible to adopt a known method for molding a solid core having a multilayer structure. For example, a multilayer core can be obtained as follows: a center core is obtained by kneading materials with a kneading machine, and by pressure vulcanization molding of the resulting kneaded product with a round mold; then materials for a surrounding layer are kneaded with a kneading machine, and the resulting kneaded product is molded into a sheet shape to obtain a sheet for the surrounding layer; the center core is covered with the sheet to prepare a covered center core; and the covered center core is then subjected to pressure vulcanization molding with the round mold to prepare the multilayer core.

Next, a cover is formed in the outer periphery of the core using a resin composition for a cover containing the plant-derived extract which absorbs ultraviolet rays of the present embodiment. When a resin composition for topcoat containing the plant-derived extract which absorbs ultraviolet rays of the present embodiment is used in order to form a topcoat, a resin composition for a cover not containing the plant-derived extract which absorbs ultraviolet rays is used in order to form the cover.

For a method for forming the cover, known golf ball cover molding methods can be adopted. The cover forming method is not particularly limited, but examples of the cover forming method include a method in which a core is disposed in a mold; and a resin composition for a cover is molded by injection molding, whereby and the cover can be formed so that it covers the core. The plant-derived extract which absorbs ultraviolet rays of the present embodiment is not decomposed under temperature conditions when the cover is molded by injection molding. Therefore, the plant-derived extract can function as the ultraviolet absorber in the cover. The mold for molding the cover has a plurality of protrusions for forming dimples on the surface of the cover. The size, shape, and number and the like of the dimples formed on the surface of the cover can be appropriately designed according to the aerodynamic properties desired for the golf ball.

The lower limit of the thickness of the cover is preferably 0.2 mm or more, and more preferably 0.4 mm or more, and the upper limit thereof is preferably 4 mm, more preferably 3 mm, and still more preferably 2 mm, but the thickness of the cover is not limited thereto.

The upper limit of the material hardness of the cover in terms of Shore D is preferably approximately 60, more preferably approximately 55, and still more preferably approximately 50, but the material hardness of the cover is not limited thereto. The lower limit of the material hardness of the cover in terms of Shore D is preferably approximately 35, and more preferably approximately 40. The resin material of the cover is formed into a sheet shape having a thickness of 2 mm, and the sheet is left for 2 weeks or more. Then, the material hardness of the cover as Shore D hardness is measured in conformity with the ASTM D2240-95 standard.

Furthermore, a topcoat (also referred to as "coating film") is formed in the outer periphery of the cover by using a resin composition for topcoat containing the plant-derived extract which absorbs ultraviolet rays of the present embodiment. As described above, when the resin composition for cover containing the plant-derived extract which absorbs ultraviolet rays of the present embodiment is used in order to form the cover, a resin composition for topcoat not containing the plant-derived extract which absorbs ultraviolet rays is used in order to form the topcoat.

The thickness of the topcoat is not particularly limited, but the lower limit of the thickness of the topcoat is preferably 7 μm, more preferably 10 μm, and still more preferably 13 μm. The upper limit of the thickness is preferably 22 μm, and more preferably 20 μm.

The method for forming the topcoat on the surface of the cover is not particularly limited, and a known method for coating a golf ball coating material on the surface of the cover can be used. Methods such as an air gun coating method and an electrostatic coating method can be used.

The topcoat may be coated, and then subjected to a step of drying the coating film. Drying conditions may be the same as known conditions in which the urethane coating material is dried. In the present embodiment, for example, a drying temperature may be approximately 40° C. or higher, and particularly 40° C. to 60° C., and a drying time may be 20 to 90 minutes, and particularly 40 to 50 minutes. The plant-derived extract which absorbs ultraviolet rays of the present embodiment is not decomposed under such drying conditions. Therefore, the plant-derived extract can function as the ultraviolet absorber in the topcoat.

The intermediate layer may be optionally provided between the core and the cover. The intermediate layer can be formed by using, as the material for the intermediate layer, the same materials as the abovementioned materials for the cover, that is, a thermoplastic polyurethane, an ionomer resin, or a mixture of these. Into the intermediate layer, in addition to the abovementioned main component, other thermoplastic elastomers, polyisocyanate compounds, fatty acids or the derivatives thereof, basic inorganic metal compounds, and fillers and the like can be added.

The lower limit of the material hardness of the intermediate layer is preferably 50, and more preferably 55, in terms of Shore D, but the material hardness of the intermediate layer is not limited thereto. The upper limit of the hardness of the intermediate layer 40 is preferably 70, and more preferably 65, in terms of Shore D.

The lower limit of the thickness of the intermediate layer is preferably 0.5 mm, and more preferably 1 mm, but the thickness of the intermediate layer is not limited thereto. The upper limit of the thickness of the intermediate layer is preferably 10 mm, and more preferably 5 mm.

This makes it possible to provide the golf ball including the cover or topcoat containing the plant-derived extract which absorbs ultraviolet rays.

EXAMPLES

Hereinafter, Examples of the present invention and Comparative Examples will be described.

When golf balls of Examples and Comparative Examples were produced, topcoats of the golf balls were produced by using coating film blending shown in Table 1. The blending in Table 1 is in parts by mass. The coating film thickness of the topcoat was set to be 15 μm. The produced golf balls were subjected to a xenon color tone change test and a xenon yellowness index change test.

As a polyol in a main agent in the coating film blending in Table 1, a polyester polyol having a weight average molecular weight (Mw) of 28,000 was used. This was synthesized by the following method. Into a reactor equipped with a reflux cooling tube, a dropping funnel, a gas introduction tube, and a thermometer, 140 parts by mass of trimethylolpropane, 95 parts by mass of ethylene glycol, 157 parts by mass of adipic acid, and 58 parts by mass of 1,4-cyclohexanedimethanol were charged. The resulting mixture was increased in temperature to 200 to 240° C. while stirring, and the mixture was heated (was allowed to react) for 5 hours. Then, a polyester polyol having an acid value of 4, a hydroxyl value of 170, and a weight average molecular weight (Mw) of 28,000 was obtained.

As the isocyanate of a curing agent, nurate (isocyanurate) of hexamethylene diisocyanate (HMDI) of Duranate TPA-100 (trade name) (NCO content: 23.1%, non-volatile content: 100%) manufactured by Asahi Kasei Corporation was used.

As an ultraviolet absorber in Table 1, "UV cut rice extract" (trade name) which was rice powder manufactured by Mono was used for a ferulic acid compound. "VELUS Castor Oil" (trade name) which was castor oil manufactured by TORASOL Pharmaceutical Co., Ltd. was used for recinoleic acid. Tinuvin479 is a triazine-based ultraviolet absorber manufactured by BASF A.G. Any of the ultraviolet absorbers was blended in the main agent. Butyl acetate was used as a solvent for both the main agent and the curing agent. The dissolution of the ultraviolet absorber in the solvent was observed and evaluated. An ultraviolet absorber dissolved without a precipitate remaining was evaluated as "very good", and an ultraviolet absorber substantially dissolved, although a precipitate was slightly observed, was evaluated as "good". The evaluation results of Examples and Comparative Examples are shown in Table 1.

Also in any of the golf balls, an ether-type thermoplastic polyurethane "PANDEX" (trade name) manufactured by DIC Covestro Polymer, Ltd. was used for the cover. The material hardness of the cover was 47 in terms of Shore D.

In any of the golf balls, the intermediate layer was composed of 35 parts by mass of Himilan 1706 (trade name), 15 parts by mass of Himilan 1557 (trade name) and 50 parts by mass of Himilan 1605 (trade name), each being an ionomer resin of an ethylene-methacrylic acid copolymer manufactured by Du Pont-Mitsui Polychemicals Co., Ltd., and 1.1 parts by mass of trimethylol propane.

In any of the golf balls, the core was composed of 20 parts by mass of a polybutadiene BR51 (trade name) manufactured by JSR Corporation and 80 parts by mass of a polybutadiene BR-01 (trade name) manufactured by JSR Corporation as a base material rubber; 28.5 parts by mass of zinc acrylate (manufactured by Wako Pure Chemical Industries, Ltd.); 1.0 part by mass of dicumyl peroxide (PERCUMYL D (trade name) manufactured by NOF Corporation) as an organic peroxide; 0.1 part by mass of 2,2-methylenebis(4-methyl-6-butylphenol) (Nocrac NS-6 (trade name)) manufactured by Ouchi Shinko Chemical Industrial Co., Ltd.) as an antiaging agent; 33.0 parts by mass of barium sulfate (Precipitated Barium Sulfate #100 (trade name) manufactured by Sakai Chemical Industry Co., Ltd.); 4.0 parts by mass of zinc oxide (Third Grade Zinc Oxide (trade name) manufactured by Sakai Chemical Industry Co., Ltd.); and 0.5 parts by mass of a pentachlorothiophenol zinc salt (manufactured by Wako Pure Chemical Industries, Ltd.) as an organosulfur compound.

Xenon Color Tone Change Test

The xenon color tone change test was performed by using a Super Xenon Weather Meter (SX 75) manufactured by Suga Test Instruments Co., Ltd. The change of the color on the surface of the ball between before and after irradiation with xenon light was measured by using a color difference meter (model name: SC-P) manufactured by Suga Test Instruments Co., Ltd. Then, the susceptibility to discoloration against yellowing of the ball (color difference $\Delta E$) between before and after the irradiation was examined, based on a Lab color system under JIS Z 8701. As the color difference $\Delta E$ is a smaller value, the discoloration is less. Yellowing was evaluated based on the color difference $\Delta E$. For the evaluation criteria, the case in which the color difference $\Delta E$ was 6.5 or less was evaluated as "very good"; the case in which the color difference $\Delta E$ was more than 6.5 and 10.0 or less was evaluated as "good"; and the case in which the color difference $\Delta E$ was more than 10.0 was evaluated as "poor".

Xenon Yellowness Index Change Test

The xenon yellowness index change test was performed by using a color difference meter (spectrum measuring apparatus "SC-P" manufactured by Suga Test Instruments Co., Ltd.) in conformity with JIS Z 8722 "Reflective Object Measurement Methods" (illumination with diffused light, an optical system in which a received light angle is 8 degrees: condition c), and the yellowness index was measured by d/8 (measured by excluding a regular reflection component of the sample: with an optical trap). The diameter of a measurement hole to be used was 30 mm. For the surface of the ball before and after irradiation with xenon light, according to a Lab color system under JIS Z 8701, values for L, a, and b, and yellowness index YI were measured to obtain a difference between the yellowness index before the irradiation and the yellowness index after the irradiation (yellowing level $\Delta YI$).

TABLE 1

| | | | Examples | | | | | | Comparative Examples | | |
|---|---|---|---|---|---|---|---|---|---|---|---|
| | | | 1 | 2 | 3 | 4 | 5 | 6 | 1 | 2 | 3 |
| Coating film blending | Main agent | Polyol | 27 | 27 | 27 | 27 | 27 | 27 | 27 | 27 | 27 |
| | | Butyl acetate | 73 | 73 | 73 | 73 | 73 | 73 | 73 | 73 | 73 |
| | Curing agent | Isocyanate | 21 | 21 | 21 | 21 | 21 | 21 | 21 | 21 | 21 |
| | | Butyl acetate | 29 | 29 | 29 | 29 | 29 | 29 | 29 | 29 | 29 |
| | Ultraviolet absorber | Ferulic acid compound | 0.3 | 0.6 | 1.5 | 3.0 | 6.0 | — | — | — | — |
| | | Recinoleic acid | — | — | — | — | — | 2.0 | — | — | — |
| | | Tinuvin479 | — | — | — | — | — | — | — | 0.3 | 0.5 |
| Coating thickness [μm] | | | 15 | 15 | 15 | 15 | 15 | 15 | 15 | 15 | 15 |
| Evaluation of dissolution of ultraviolet absorber | | | Very good | Very good | Very good | Very good | Good | Very good | — | Very good | Very good |
| Xenon color tone change test | Color difference $\Delta E$ | | 9.5 | 8.8 | 7.0 | 6.5 | 6.5 | 9.3 | 11.0 | 6.5 | 4.3 |
| | Evaluation | | Good | Good | Good | Very good | Very good | Good | Poor | Very good | Very good |
| Xenon yellowness index change test | Yellowing level $\Delta YI$ | | 14.5 | 13.6 | 11.5 | 10.1 | 10.1 | 15.9 | 17.0 | 9.8 | 7.2 |

As shown in Table 1, the golf ball of Comparative Example 1 not containing an ultraviolet absorber at all had a high color difference $\Delta E$ of 11.0 in the xenon color tone change test, which had conspicuous yellowing. In addition, the golf balls of Comparative Examples 2 and 3 using petroleum-derived triazine-based Tinuvin479 as the ultraviolet absorber had a very low color difference $\Delta E$ of 6.5 in a small blending amount of 0.3 to 0.5 parts by mass, which hardly had yellowing.

The golf balls of Examples 1 to 5 using a ferulic acid compound which was a plant-derived extract as an ultraviolet absorber had a color difference ΔE of 10.0 or less at any concentration. The ferulic acid compound was blended in the topcoat of the golf ball, whereby it was confirmed that the yellowing of the golf ball can be prevented. In particular, as the blending amount of the ferulic acid compound increased, the color difference ΔE was lower, whereby the same effect as that of the petroleum-derived ultraviolet absorber could be obtained. However, it was found that when the blending amount of the ferulic acid compound was excessively large, the ferulic acid compound did not completely dissolve in the solvent.

The golf ball of Example 6 using recinoleic acid which was a plant-derived extract also had a color difference ΔE of 10.0 or less. It was confirmed that the recinoleic acid is blended in the topcoat of the golf ball, whereby the yellowing of the golf ball can be prevented.

What is claimed is:

1. A golf ball comprising a core, a cover, and a topcoat, wherein the cover or the topcoat comprises a plant-derived extract which absorbs ultraviolet rays, and
the cover or the topcoat has a color difference ΔE of 10.0 or less in a Lab color system between before and after a color tone change test, the color tone change test being carried out by irradiation with a xenon lamp.

2. The golf ball according to claim 1, wherein the plant-derived extract comprises ferulic acid, a ferulic acid compound, a cinnamic compound, linoleic acid, or a combination thereof.

3. The golf ball according to claim 1, wherein the plant-derived extract has an absorbance peak at a wavelength of 320 nm to 360 nm.

4. The golf ball according to claim 1, wherein the topcoat comprises the plant-derived extract, and the topcoat further comprises an oil-based coating material.

5. A resin composition for a cover or topcoat of a golf ball, the resin composition comprising:
a resin for a cover or topcoat of the golf ball; and
a plant-derived extract which absorbs ultraviolet rays,
wherein the resin composition has a color difference ΔE of 10.0 or less in a Lab color system between before and after a color tone change test, the color tone change test being carried out by irradiating a film formed from the resin composition with a xenon lamp.

6. The resin composition for a cover or topcoat of a golf ball according to claim 5, wherein the resin for topcoat comprises a urethane coating material containing a main agent and a curing agent, and
a content of the plant-derived extract is in a range of 0.01 to 8.0% by mass with respect to a total amount of the main agent inclusive of a solvent.

7. The golf ball according to claim 6, wherein the solvent comprises an ester solvent or a ketone solvent.

* * * * *